United States Patent [19]
Flint

[11] Patent Number: 5,309,541
[45] Date of Patent: May 3, 1994

[54] FLEXIBLE LIGHT CONDUIT

[75] Inventor: Graham W. Flint, Albuquerque, N. Mex.

[73] Assignee: Laser Power Corporation, San Diego, Calif.

[21] Appl. No.: 49,012

[22] Filed: Apr. 16, 1993

[51] Int. Cl.⁵ .............................................. G02B 6/00
[52] U.S. Cl. ........................... 385/133; 385/125; 385/902; 359/365; 359/366; 359/435; 359/503; 359/821; 359/858; 359/894
[58] Field of Search ............... 385/133, 125, 146, 147, 385/900–902; 359/821, 822, 823, 827, 850, 855, 856, 857, 858–861, 862, 863, 871, 872, 876, 894–896, 364, 365, 366, 434, 435, 503, 504, 505, 506, 726–732

[56] References Cited

U.S. PATENT DOCUMENTS

| | | | |
|---|---|---|---|
| 499,097 | 6/1893 | Colby | 362/250 |
| 2,424,064 | 7/1947 | Stegeman | 385/133 |
| 3,641,333 | 2/1972 | Gendron | 240/6.4 W |
| 3,653,738 | 4/1972 | Gloge | 385/133 |
| 3,920,980 | 11/1975 | Nath | 240/1 LP |
| 4,045,119 | 8/1977 | Eastgate | 350/96 LM |
| 4,194,808 | 3/1980 | Marhic et al. | 350/96.32 |
| 4,411,490 | 10/1983 | Daniel | 359/894 |
| 4,439,818 | 3/1984 | Sheib | 362/250 |
| 4,688,893 | 8/1987 | Laakmann | 350/96.32 |
| 4,929,052 | 5/1990 | Colles et al. | 350/96.32 |
| 4,950,958 | 8/1990 | Lin | 315/185 R |
| 5,054,869 | 10/1991 | Doyle | 385/133 |
| 5,057,981 | 10/1991 | Bowen et al. | 362/219 |
| 5,113,036 | 5/1992 | Arroyo et al. | 385/100 |

*Primary Examiner*—Frank Gonzalez
*Attorney, Agent, or Firm*—Baker, Maxham, Jester & Meador

[57] ABSTRACT

A flexible light conduit which preserves the coherence of a transmitted beam. Several conduit elements having optical elements mounted inside each one are connected together to form a chain. Each conduit element is tiltably coupled to each adjacent conduit element in the chain. The optical elements may be refractive or reflective. The conduit preserves the spatial coherence properties of the beam so the input image is reimaged at a distant place, having passed through the series of relay optical elements through the angles permitted by the coupling members.

37 Claims, 3 Drawing Sheets

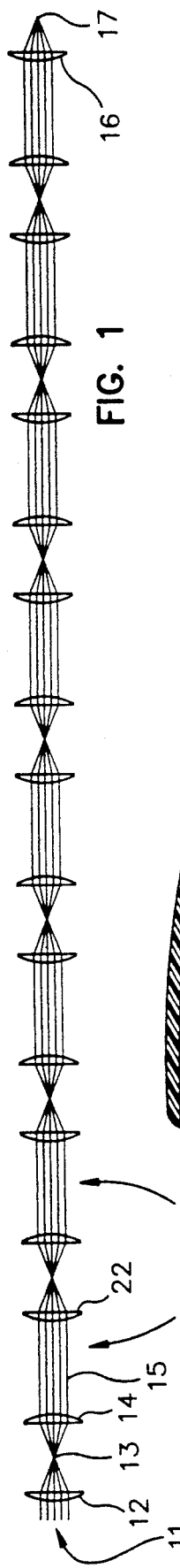
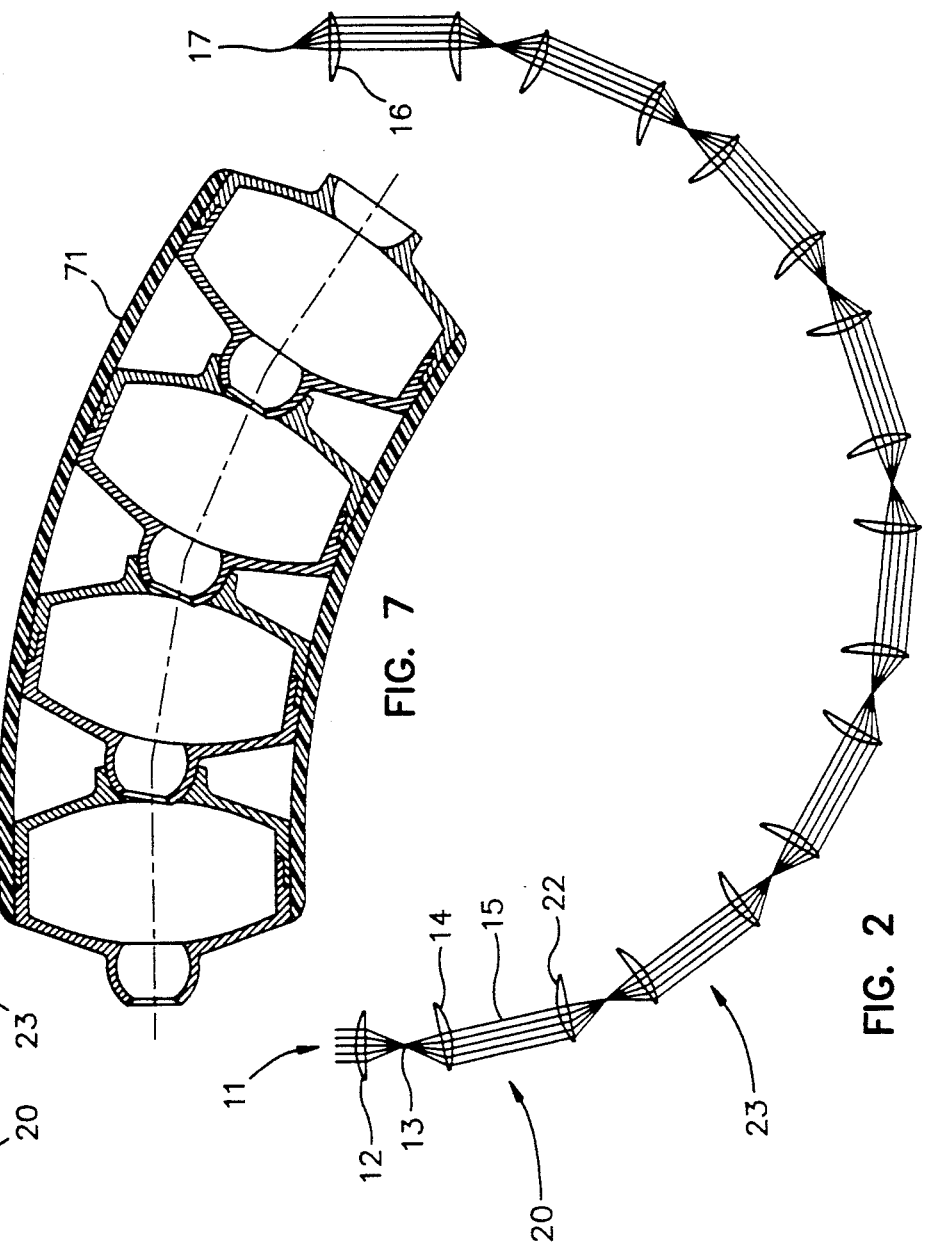

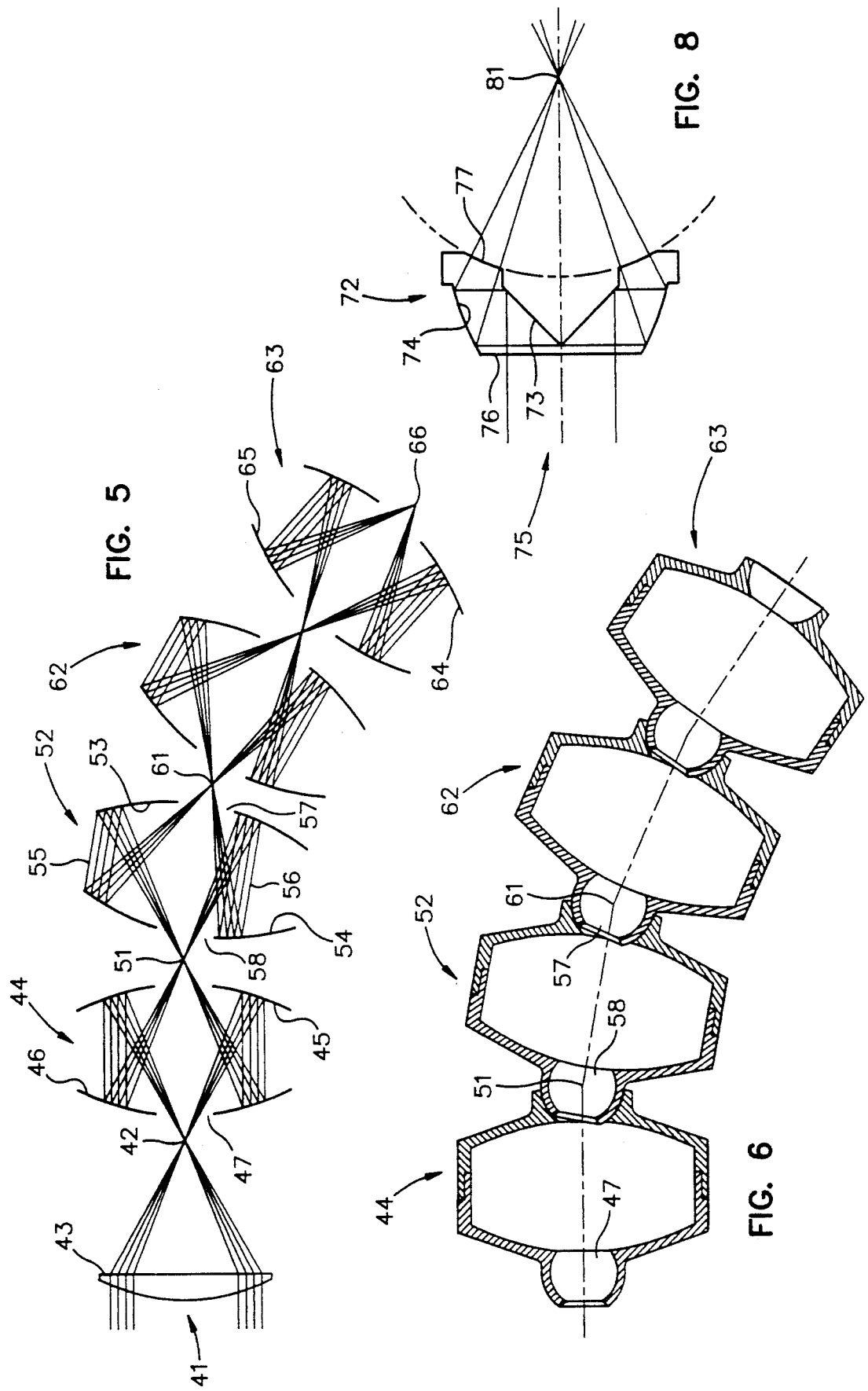

FLEXIBLE LIGHT CONDUIT

FIELD OF THE INVENTION

This invention relates generally to flexible light conduits and more particularly to such a conduit for transmitting a beam of electromagnetic radiation, typically from a laser source, in a manner to preserve the spatial coherence properties of the beam.

BACKGROUND OF THE INVENTION

Flexible light conduits are employed for a variety of purposes which span the entire range of medical lasers and industrial process lasers. Various types of flexible light conduits, such as optical fibers and optical waveguides, have previously been available. A characteristic of these conventional flexible light conduits is that they tend to cause the spatial coherence of the transmitted beams to be scrambled. This scrambling property of fibers and waveguides is particularly pronounced when the physical cross section of the conduit is very large in comparison to the wavelength of transmitted radiation, such as in situations where the power to be transmitted is sufficiently high as to require a conduit of large cross section. A consequence of the inability of conventional flexible light conduits to maintain coherence properties and mode quality is that the beam loses certain aspects of its focusability at the output of the conduit. This loss of coherence, or scrambling, results in significant transmission attenuation and loss of output power.

This loss of coherence and consequent reduction in the ability to focus the transmitted light from the output end of the flexible conduit, has significantly limited the applications in which flexible light conduits have significant value.

SUMMARY OF THE INVENTION

Broadly speaking, this invention features coherence preserving properties which render it particularly appropriate to applications where high-power laser beams must be transmitted over flexible paths. Such applications span a very large range of laser end uses.

A significant feature of the invention involves the use of optical relay elements which are disposed along the transmission path in such a way that focused regions of the beam coincide with discrete pivot points which, collectively, result in a flexible conduit. Another aspect of the invention includes the use of optical relay elements which have a larger diameter than that of the collimated regions of the transmitted beam. This oversizing of the optical relay elements permits bending at the pivot points to occur without vignetting of the beam. Examples of optical relay elements are lenses, mirrors, or a combination of such elements.

BRIEF DESCRIPTION OF THE DRAWING

The objects, advantages and features of this invention will be more clearly perceived from the following detailed description, when read in conjunction with the accompanying drawing, in which:

FIG. 1 schematically illustrates the optical geometry of a refractive embodiment of the flexible light conduit of the invention in a non-flexed condition;

FIG. 2 shows the optical geometry of FIG. 1 with the light beam bent through a 180° angle;

FIG. 5 shows the optical geometry of the reflective beam conduit of FIG. 4 in a flexed state;

FIG. 6 is a cross sectional view of an exemplary structure for the reflective beam conduit of FIGS. 4 and 5;

FIG. 7 shows the structure of FIG. 6 within a flexible tube; and

FIG. 8 is a beam matching element which combines refractive and reflective elements to be used with the FIGS. 4–7 embodiment.

DESCRIPTION OF THE PREFERRED EMBODIMENTS

Figure 3:
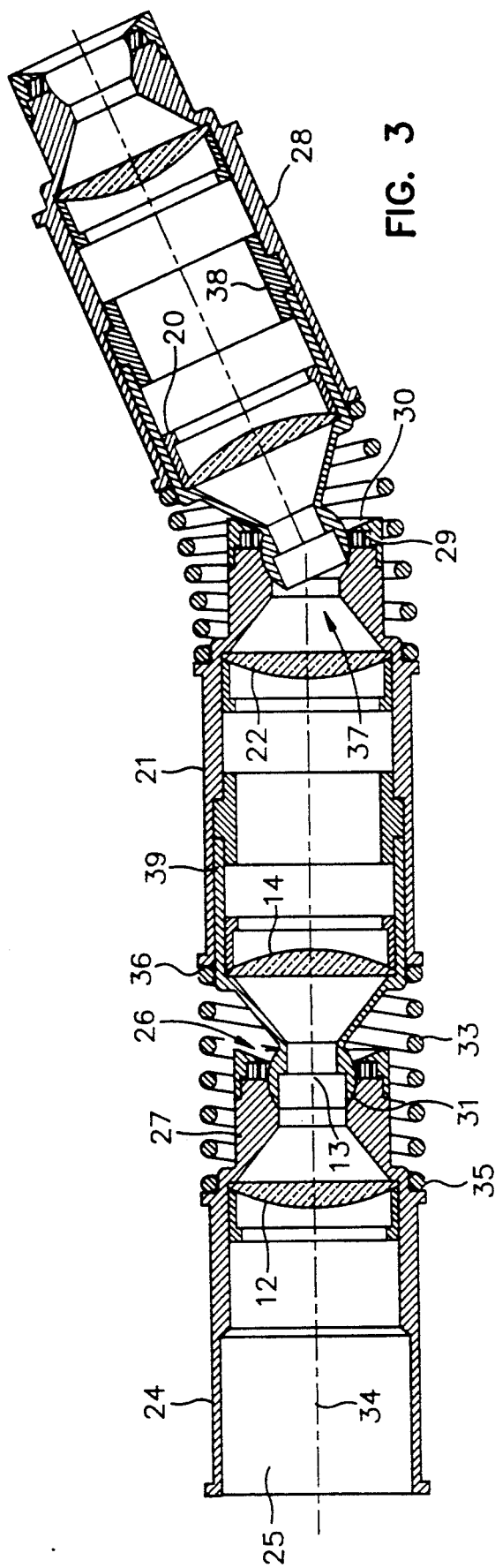
FIG. 3 is a cross sectional view of a portion of an exemplary for accomplishing the optical geometry of FIGS. 1 and 2.

With reference now to the drawing, and more particularly to FIGS. 1–3 thereof, there is shown a collimated beam of light 11 entering the conduit through input lens 12. Lens 12 focuses collimated beam 11 at point 13. This point may be referred to hereinafter as a focus or pivot point. From focal point 13, the beam expands out to second lens 14 where it again becomes a collimated beam 15. This process is repeated through eight pairs of positive lenses in the embodiment shown in FIGS. 1 and 2.

The beam is brought to focus midway between each lens pair at the pivot points whereas the space between lens pairs is occupied by the collimated beam. Singlet fast lenses may be used in the manner shown. When such lenses are used, they typically must be of aspheric form so as to avoid the cumulative effects of spherical aberration. Alignment of input beam 11 is preferably arranged such that the focal points, such as 13, along the beam fall very close to the optical axes of the lenses. This condition avoids the cumulative effects of astigmatism and coma which otherwise could be introduced by a chain of fast aspheric lenses. Requisite input alignment accuracies for typical geometries are in the order of 0.5°.

Final lens 16 of the beam train illustrated in FIG. 1 serves to bring the beam to a focus at point 17. Although shown with a focal length similar to that of other lenses in the chain, the use of a matched focal length final lens is not a requirement. It is, however, preferred that the focal length of the last lens be consistent with the input requirements of the device to which the beam must be transmitted. In the simple case of material processing applications, where the final focus typically falls at the surface of a work piece the focal length of the final lens is chosen so as to provide an optimum working distance. This indicates that there is considerable flexibility in the focal length of lens 16.

FIG. 2 represents the apparatus schematically shown in FIG. 1 with the introduction of an angular deflection at each focus/pivot point. Commencing with collimated input beam 11, lens pair 20 comprising second and third lenses 14 and 22, respectively, is angled to a 12° tilt with respect to the axis of input lens 12. Note that such tilt shifts the location of the collimated beam between lenses 14 and 22 of pair 20. However, since the first focal point 13 remains on-axis with respect to second lens 14, the axis of emerging beam 15 remains parallel to the common axis of lenses 14 and 22 of lens pair 20. Thus, despite the introduction of a lateral offset, the geometry of the beam maintains its symmetry with respect to the second and third lenses.

The angle introduced between first lens pair 20 and second lens pair 23 can be twice that of the first lens pair with respect to the axis of first lens 12, that is, 24° in this particular example. Likewise, all subsequent lens pairs can accommodate a 24° tilt with respect to each other, except the last lens pair is preferably also at one-half the larger tilt so that the exiting beam is as much centered as possible. Thus, the use of eight lens pairs provides a flexible conduit which can be bent through a total angle of about 180°. This bend capability is typical of the invention, but modification of the basic design will yield greater or lesser degrees of flexibility. Of course, the number of lens pairs is readily changed, another way to change the angle capability of the conduit.

It can now be understood that by using the principles of this invention, with appropriate lenses and numbers of lens pairs, substantially any degree of bend is possible. With an appropriate physical structure, the bend illustrated in FIG. 2 is not limited to two dimensions. Rotation at the pivot points permits 3 degrees of freedom. These may be referred to as 2 degrees of tilt and 1 degree of rotation. It permits the train of lens pairs to be bent in any direction, one with respect to the other, within the limitations permitted by the flexible joints.

The mechanical design of a typical beam train employing refractive elements related to the optical geometry of FIGS. 1 and 2, is shown in FIG. 3. This is a segment from the left end in FIG. 1 showing input lens 12, structural conduit element 21 comprising the pair of lenses 14 and 22, and conduit element 28 with its pair of lenses. Input cylinder 24 provides opening 25 for receiving input collimated beam 11. Lens 12 focuses the beam at focal/pivot point 13 which is in the middle of ball joint 26. Forward end 27 of cylinder 24 is formed to removably receive ball 31 of second cylindrical element 21 in a secure, rotatable and tiltable manner while being separable. The mechanical structure of the ball joint may be conventional, where socket portion 27 is threaded on the smaller diameter right end to receive retaining ring or sleeve 20. This ring captures bearing ring 29 which directly bears on ball 31. Ring 20 is formed with beveled opening surfaces 30 which limit the tilt of one conduit element with respect to another. Compression spring 33 maintains a bias or load on ball joint 26 so that the space relationship between lenses 12 and 14, along axis 34, is maintained. The left end of spring 33 is retained against shoulder 35 on cylinder 24, while the right end is seated on shoulder 36 on cylinder 21. Each of the compression springs, such as spring 33, serve dual functions. As stated previously, they preload the ball joints, permitting their spherical seats to be one-sided, while at the same time, ensuring that the focal point of each lens coincides precisely with the pivot point of the corresponding ball joint. As a second function of spring 33, it transmits bend-induced torques throughout the length of the conduit, thereby creating a situation where the total bend applied to the conduit is distributed in a reasonably uniform manner among the individual joints.

A further example of the flexibility of the conduit and coupling elements relates to the means for securing the sleeve cylindrical element to the ball element. Double threaded interior ring 38 is threaded to the interior of element 21 and cylindrical portion 39 of ball 31 is threaded to the opposite side thereof. This allows disassembly of conduit elements without disassembling a coupling. Of course, this is an example only and is not definitive of the conduit element structure.

An optical feature of the geometry of FIG. 3, which is not essential to the invention, is that the lenses of a lens pair, such as lenses 14 and 22 of pair 20, are spaced by approximately twice the focal length of each individual lens. That means that for the preferred embodiment shown, the distance between focal points is four times the focal length of any one lens. For example, for a thin lens approximation to the beam train, separation will be precisely twice the focal length. For practical purposes, any arbitrary spacing yields a longitudinal magnification of unity from one focal point to the next. However, this specific spacing preserves the unity magnification condition despite modest axial shifts of the focal points relative to ball joint centers. Hence, for this condition, it becomes possible to replicate an axial line focus from one end of the beam train to the other. The advantage of a line focus feature relates to the deliberate introduction of such a focus when extremely high-power beams must be transmitted. In particular, use of a line focus, rather than a point focus, effects a substantial reduction of the electric field strength in the vicinity of each focal region, thereby greatly increasing the power which can be transmitted prior to the onset of air breakdown or electrical discharge at the pivot points.

It can easily be seen from the structure of FIG. 3 how cylinder 21 can be restricted in bending of its axis with respect to the axis of cylinder 24 in any desirable manner. As discussed above, that restriction would be a maximum of 12° in the example presented. On the other hand, joint 37 would be permitted to bend as much as 24° in the example shown before a stop built into the two mating elements of the ball joint prevented a further bend beyond that desired limitation.

By way of example, one application of the present invention lies in the transmission of high-power infrared beams, particularly those which are produced by $CO_2$ lasers and which have a wavelength of about 10.6 microns. Relative to this wavelength, the optical tolerances of optical surfaces within the conduit can be maintained at a level wherein the cumulative effects of multiple surface errors do not significantly degrade the coherence of a transmitted beam. For example, a prototypical device containing 18 aspheric lenses has demonstrated an RMS wave front aberration of less than $\lambda/10$ when the device is operated at its maximum deflection angle of 180°. To achieve this level of performance, the lenses were of zinc selenide and were fabricated by single point diamond turning. These are characteristic of the preferred embodiment, but not limiting of the scope of the invention.

In some applications, mirrors of similar size may be desired for handling a higher power light beam than might be possible under some circumstances with zinc selenide lenses. Additionally, when singlet lenses are employed, each light conduit must be designed for operation at a single wavelength, for example, 10.6 microns. This constriction makes it impractical to transmit an alignment beam through the conduit of FIGS. 1-3. In some applications where an alignment beam is necessary, it must be introduced by means of a beam splitter which is located downstream of the flexible conduit.

Figure 4:
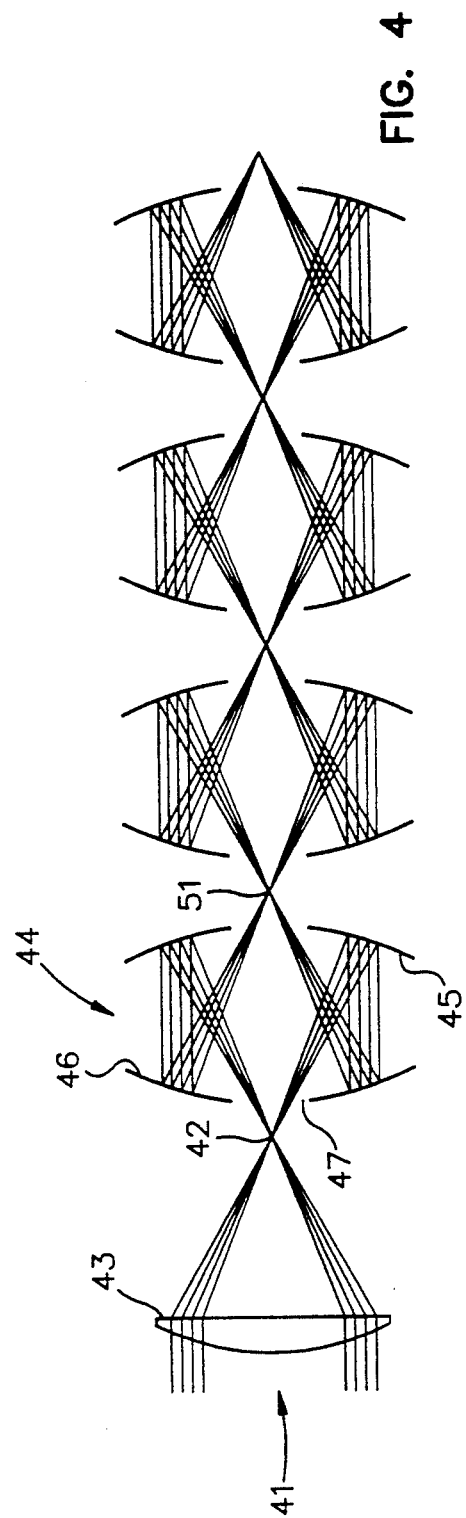
FIG. 4 depicts the optical geometry of a reflective beam embodiment constructed in accordance with the invention in a non-flexed state.

The above limitations, which do not diminish the practical applicability of the refractive embodiment of FIGS. 1-3, can be circumvented by the all-reflective embodiment of FIGS. 4-6. FIG. 4 illustrates the optical geometry of a reflective light conduit constructed in accordance with the invention, shown in a non-flexed state. Incoming coherent light beam 41 is focused at point 42 by means of input lens 43, much as the input in the FIGS. 1-3 embodiment. However, the beam expanding from focal point 42 enters element 44 comprising a pair of parabolic surfaces 45 and 46. The light beam is reflected, after entry through aperture 47 in surface 46, by parabolic surface 45, resulting in a parallel or coherent beam reflected to surface 46 which then focuses the beam at point 51. This process is repeated as many times as desired through a train of pairs of parabolic surfaces which are arranged so as to provide a series of focal points which fall midway between the parabolic pairs. The parabolas which make up each pair are fixed with respect to each other but are free to pivot relative to adjacent pairs. As with the embodiment of FIGS. 1-3, the location of pivot points coincides with the intermediate focal points such as focal point 51.

As with the refractive embodiment, the transmitted beam geometry of the reflective device is constrained so as to underfill the mirrors. This is clearly depicted in FIGS. 4 and 5. For a reflective embodiment of the invention as illustrated, this underfilling characteristic applies relative to both the outer perimeter of each mirror and to the central perforation or aperture which allows passage of the beam from one mirror pair to the next. Consequently, the cross sectional geometry of the beam, while passing through the conduit is, of necessity, annular in nature. Output beams from certain types of laser resonators already are of annular geometry, allowing them to be injected directly into such a conduit. However, in the more frequently encountered case with beams having solid cross sections, conversion of the beam footprint from solid to annular must be performed by an input matching element such as that shown in FIG. 8.

With general reference to the description of FIG. 2, when the optical geometry of FIG. 4 is subjected to bending, it behaves in the manner shown in FIG. 5. Note that, as in the case of the refractive embodiment, the focal points remain on-axis relative to the parabolic reflective surface pairs, while the collimated regions of the beam are displaced radially so as to accommodate the bend. Thus, element 44 remains in alignment with the axis of input lens 43 so that from input beam 41 to second focal point 51 the representation is identical with FIG. 4. Parabolic reflector pair 52 is tilted by 10° with respect to element 44 comprising parabolic surfaces 45 and 46. This causes the internal reflections between reflective surfaces 53 and 54 to shift radially so that the outer parallel portion 55 is near the radial extremities of reflective surfaces 53 and 54 whereas inner parallel beam segment 56 is closer to apertures 57 and 58 of the reflective surfaces. This results in focal point 61 which is no longer on the input beam axis, but is still on the internal axis of reflector pair 52.

As shown in FIG. 5, the third parabolic pair 62 is tilted at a 20° angle with respect to pair 52 whereas fourth pair 63 is tilted only about 10° with respect to pair 62. This shifts the reflections between parabolic surfaces 64 and 65 back toward the center rather than being offset as in the previous two parabolic reflector pairs. As with the embodiment of FIGS. 1-3, a longer beam train with more mirror pairs enables all the internal mirror pairs to be tilted to about 20° with respect to each other. It is convenient to use a 10° tilt at the final pivot because this arrangement produces an axisymmetric beam at the output focus point 66 as shown in FIG. 5.

An exemplary mechanical layout for a reflective apparatus is shown in FIG. 6. The input lens apparatus is not shown but such structure is easily within the ability of the person of ordinary skill in this technical field. It could be very similar to cylinder 24, socket 27 and lens 12 of FIG. 3. A particular feature of this structure is that only two parts are needed for each pair of parabolic reflecting surfaces which interconnect with the ball joints of the type shown. As with the FIG. 3 embodiment, external tensioning devices such as compression springs would be necessary to maintain positive engagement of each ball joint. Note that in the embodiment of FIG. 6, the parabolic reflecting surfaces are applied directly to the structural elements, for example, by single point diamond turning of the metal shell element. Metal shells with coated surfaces which are polished to form the optically reflective surfaces may be used. Focal point 51 between parabolic reflector element 44 and element 52 would be centered in the ball joint, just as in the FIGS. 1-3 embodiment. That structure continues throughout the chain of reflector elements.

With respect to the structures shown in FIG. 6, the stiffening effects of the interior hubs, together with the integral flanges which make up the outer cylindrical walls, allow the parabolic elements themselves to have thin cross sections, thereby yielding a light-weight structure.

In a practical device, the parabolic reflector element train of FIG. 6 can be loaded into a flexible tube, the inside diameter of which matches the outside diameter of the reflector elements. Such a tube 71 serves a multitude of purposes, and is shown in FIG. 7. First, by selecting a tube of suitably elastic construction, and by providing a means for pretensioning of that tube, a simple means is provided whereby all elements internal to the tube are maintained under axial compression, thereby preserving the optical geometry of the conduit. Additionally, by reenforcing the tube to provide a modest resistance to bending, bending torques can be distributed along the length of the conduit so as to distribute pivot angles in an approximately uniform manner. A third function of the flexible tube is that it provides an outer seal for the entire conduit so that the ball joints are protected from dirt and other contamination. Further, this outer seal provided by the flexible tube facilitates the introduction of an axial stream of cooling gas, a feature which becomes desirable when extremely high powers are to be transmitted by means of the flexible light conduit. By being formed with axial apertures, the parabolic reflecting elements permit cooling gas to flow freely from one end of the conduit to the other. For applications calling for extremely high peak powers, the addition of an external tube facilitates pressurization of the entire device, thereby reducing its susceptibility to gas breakdown. The pressurization may be provided by air or any of several gases having low optical absorption at the wavelength of the light through the conduit, and having high dielectric breakdown strength. In medical applications, the addition of a smooth outer sheath also simplifies the task of maintaining an appropriate degree of cleanliness. Further, for industrial applications, where rough handling may be unavoidable, an elastic outer sheath can be formulated so as to provide a high degree of impact resistance. When the external tube is used in conjunction with the FIG. 3 structure, it may be somewhat loose fitting to allow cooling air or gas to flow over the structure when high power beams are transmitted.

The invention is not limited to employing a tube with the reflective embodiment—it can also be advantageously used with the refractive embodiment of FIG. 3.

As mentioned previously, when the input beam has a solid cross section, which is the most likely event, the reflective embodiment of this invention requires the use of an input matching device. Such a device would generally take the form of concentric axicons and can encompass reflective elements, refractive elements, or a combination of both. Reflective elements have the advantage of achromaticity, thereby permitting simultaneous transmission of the high-power infrared radiation and the visible alignment beams required in some applications, particularly in the medical field. Refractive devices offer an advantage relative to vignetting of the beam, insofar as they do not require a spider for the purpose of supporting the inner element of an axicon pair.

An example of an input matching device particularly appropriate for use with the FIGS. 4-6 embodiment is shown in FIG. 8. This is a novel beam matching device that combines refractive and reflective elements in a manner which achieves achromaticity in the absence of vignetting. Beam matching element 72 is a solid, transparent device providing total internal reflection at two surfaces 73, 74, while allowing all rays to enter and exit the device at normal incidence. Thus, incoming beam 75 enters normal to surface 76 and reflects off conical surface 73 toward parabolic surface of revolution 74. With the geometry shown, the reflected beam exits element 72 through curved surface 77 at a 90° angle to focus at point 81. This focal point could correspond to input focal point 42 in FIGS. 4 and 5.

Production of this rotationally symmetric device is preferably by means of diamond turning. By using a high index material, such as zinc selenide, high transmittance is made possible for both visible and infrared radiation while at the same time permitting a simple geometry wherein all internal angles of incidence fall well beyond those required for total internal reflection. This device is particularly suited for use at the input to the flexible light conduit of FIGS. 4-6 where the input beam is solid and must be converted to annular form. There may be other axicon structures which could perform the desired function.

In view of the above description, it is clear that improvements and modifications to the invention will likely occur to those skilled in the art which are within the scope of the accompanying claims. For example, the output beam may be focused, parallel, or divergent, as desired by the end user. Examples of switchable pressurizing gases include argon, nitrogen, and sulfur hexafluoride and possibly others.

What is claimed is:

1. An elongated flexible light conduit for transmitting a beam of light from a source of the light to a working location, said conduit comprising:
    a plurality of rigid conduit elements;
    a coupling means connecting together each two adjacent said conduit elements so as to define a pivot point between each two said conduit elements and permitting alignment between each two adjacent said conduit elements to be varied, a plurality of said coupling means and conduit elements comprising a chain and forming said flexible conduit;
    a spaced pair of optical elements within each said conduit element, an optical axis being defined between said optical elements of each said pair of optical elements, said optical elements and said pivot points being so arranged and configured that when the light beam is focused at one of said pivot points at one end of a said conduit element and substantially on the optical axis defined between said pair of optical elements, that beam is transmitted between said optical elements in said pair of optical elements in a parallel manner and focused thereby at the next pivot point at the opposite end of said conduit element;
    an input optical element for focusing the input beam substantially on the axis thereof generally at the first pivot point of the first of said conduit elements in said chain; and
    an output optical element which provides the output beam of a desired convergence/divergence from the last of said conduit elements in said chain.

2. The flexible light conduit recited in claim 1, wherein each said coupling means is disengageable.

3. The flexible light conduit recited in claim 1, wherein each said coupling means comprises stop means to limit the angle of tilt of each said conduit element with respect to adjacent said conduit elements.

4. The flexible light conduit recited in claim 1, wherein said coupling means are rotatable as well as tiltable.

5. The flexible light conduit recited in claim 1, wherein said optical elements within said conduit elements are lenses.

6. The flexible light conduit recited in claim 5, wherein the distance between each said lens pair in each said conduit element is about twice the focal length of each said lens.

7. The flexible light conduit recited in claim 5, wherein the distance between successive pivot points in said chain is about four times the focal length of each lens in said conduit elements.

8. The flexible light conduit recited in claim 1, wherein said optical elements within said conduit elements are reflective means.

9. The flexible light conduit recited in claim 8, wherein said reflective means are mirrored surfaces of generally parabolic configuration.

10. The flexible light conduit recited in claim 1, wherein said input optical element comprises a lens mounted in a first one of said conduit elements.

11. The flexible light conduit recited in claim 1, wherein said output optical element is the last optical element in the last conduit element in said chain.

12. The flexible light conduit recited in claim 3, wherein the first conduit element is tiltable with respect to the input optical axis by a first predetermined angle, succeeding conduit elements in said chain being tiltable with respect to each adjacent other at a second predetermined angle which is about twice the first predetermined angle.

13. The flexible light conduit recited in claim 3, wherein the last conduit element in said chain is tiltable with respect to the next adjacent conduit element by a third predetermined angle, preceding conduit elements in said chain being tiltable with respect to each adjacent other at a second predetermined angle which is about twice the third predetermined angle.

14. An elongated flexible light conduit for refractionaly transmitting a beam of light from a source of the light to a working location, said conduit comprising:
   a plurality of rigid conduit elements;
   a coupling means connecting together each two adjacent said conduit elements so as to define a pivot point between each two said conduit elements and permitting alignment between each two adjacent said conduit elements to be varied, a plurality of said coupling means and conduit elements comprising a chain and forming said flexible conduit;
   a spaced pair of lenses within each said conduit element, an optical axis being defined between said lenses of each said pair of lenses, said lenses and said pivot points being so arranged and configured that when the light beam is focused at one of said pivot points at one end of a said conduit element and substantially on the optical axis defined between said pair of lenses, that beam is transmitted between said lenses in said pair of lenses in a parallel manner and focused thereby at the next pivot point at the opposite end of said conduit element;
   an input optical element for focusing the input beam on the axis thereof at the first pivot point of the first of said conduit elements in said chain; and
   an output optical element for focusing the beam at a predetermined distance from the last of said conduit elements in said chain;
   whereby the input image is faithfully reimaged at the output of said conduit.

15. The flexible light conduit recited in claim 14, wherein each said coupling means is disengageable.

16. The flexible light conduit recited in claim 14, wherein each said coupling means comprises stop means to limit the angle of tilt of each said conduit element with respect to adjacent said conduit elements.

17. The flexible light conduit recited in claim 16, wherein the first conduit element is tiltable with respect to the input optical axis by a first predetermined angle, succeeding conduit elements in said chain being tiltable with respect to each adjacent other at a second predetermined angle which is about twice the first predetermined angle.

18. The flexible light conduit recited in claim 16, wherein the last conduit element in said chain is tiltable with respect to the next adjacent conduit element by a third predetermined angle, preceding conduit elements in said chain being tiltable with respect to each adjacent other at a second predetermined angle which is about twice the third predetermined angle.

19. An elongated flexible light conduit for reflectively transmitting a beam of light from a source of the light to a working location, said conduit comprising:
   a plurality of rigid conduit elements;
   a coupling means connecting together each two adjacent said conduit elements so as to define a pivot point between each two said conduit elements and permitting alignment between each two adjacent said conduit elements to be varied, a plurality of said coupling means and conduit elements comprising a chain and forming said flexible conduit;
   a spaced pair of mirrored surfaces within each said conduit element, an optical axis being defined between said mirrored surfaces of each said pair of mirrored surfaces, said mirrored surfaces and said pivot points being so arranged and configured that when the light beam is focused at one of said pivot points at one end of a said conduit element and substantially on the optical axis defined between said pair of mirrored surfaces, that beam is transmitted between said mirrored surfaces in said pair of mirrored surfaces in a parallel manner and focused thereby at the next pivot point at the opposite end of said conduit element;
   an input optical element for focusing the input beam on the axis thereof at the first pivot point of the first of said conduit elements in said chain; and
   an output optical element for focusing the beam at a predetermined distance from the last of said conduit elements in said chain;
   whereby the input image is faithfully reimaged at the output of said conduit.

20. The flexible light conduit recited in claim 19, wherein each said coupling means is disengageable.

21. The flexible light conduit recited in claim 19, wherein each said coupling means comprises stop means to limit the angle of tilt of each said conduit element with respect to adjacent said conduit elements.

22. The flexible light conduit recited in claim 21, wherein the first conduit element is tiltable with respect to the input optical axis by a first predetermined angle, succeeding conduit elements in said chain being tiltable with respect to each other adjacent at a second predetermined angle which is about twice the first predetermined angle.

23. The flexible light conduit recited in claim 21, wherein the last conduit element in said chain is tiltable with respect to the next adjacent conduit element by a third predetermined angle, preceding conduit elements in said chain being tiltable with respect to each adjacent other at a second predetermined angle which is about twice the third predetermined angle.

24. A method for transmitting a beam of light where the input beam axis is different from the output beam axis, the method comprising the steps of;
   providing a plurality of rigid conduit elements, each conduit element having a spaced pair of optical elements therein and defining an optical axis therebetween;
   flexibly coupling together adjacent conduit elements in a chain to form a flexible conduit, the couplings defining a pivot point at each coupling between adjacent conduit elements to permit each conduit element to be tilted with respect to each adjacent conduit element;
   applying the beam of light to the input end of the flexible conduit;
   focusing the beam of light at the pivot point of the first conduit element;
   arranging the optical element pairs and pivot points so that the light beam within each said conduit element is parallel and is focused at each pivot point between conduit elements; and
   focusing the output light beam from the last conduit element in the flexible conduit at a predetermined distance therefrom to thereby reimage the input light beam at the output of the flexible conduit.

25. The method recited in claim 24, and comprising the further step of providing tilt limiting means in each coupling.

26. The method recited in claim 25, wherein the tilt limiting means at one end of the chain permits a smaller angle of tilt between adjacent conduit elements than is permitted between adjacent conduit elements in the interior of the chain.

27. The method recited in claim 24, wherein the optical elements are refractive.

28. The method recited in claim 24, wherein the optical elements are reflective.

29. The method recited in claim 24, wherein the couplings are disengageable.

30. The method recited in claim 24, and comprising the further step of encasing the chain in a flexible tube having elasticity chosen to distribute the bending torques generally uniformly along the length of the chain.

31. The method recited in claim 24, and comprising the further steps of:
   encasing the chain in a flexible tube and sealing the tube at each end to conduit elements; and
   pressurizing the interior of the tube which includes the chain.

32. The method recited in claim 31, wherein the flexible tube has elasticity chosen to distribute the bending torques generally uniformly along the length of the chain.

33. The method recited in claim 31, wherein the pressurizing medium is selected from the group consisting of air and gases having a low optical absorption at the wavelength of the light beam and having high dielectric breakdown strength.

34. The flexible light conduit recited in claim 1, and further comprising a flexible tube fitted around the length of said chain, said tube being configured with elasticity chosen to distribute the bending torques generally uniformly along the length of said chain.

35. The flexible light conduit recited in claim 1, and further comprising a flexible tube fitted around the length of said chain and sealed thereto at both ends to permit pressurization within said tube.

36. The flexible light conduit recited in claim 35, wherein pressurization is provided by a gas selected from the group consisting of air and gases having a low optical absorption at the wavelength of the light beam and having high dielectric breakdown strength.

37. The flexible light conduit recited in claim 35, wherein said flexible tube is configured with elasticity chosen to distribute the bending torques generally uniformly along the length of said chain.

* * * * *